United States Patent [19]

World

[11] Patent Number: 4,508,642
[45] Date of Patent: Apr. 2, 1985

[54] METHOD OF OBTAINING GREATER LIFETIME DURATION FROM CHEMILUMINESCENT SYSTEMS

[76] Inventor: Victor B. World, 92 N. Elmwood Ave., Glenolden, Pa. 19036

[21] Appl. No.: 487,317

[22] Filed: Apr. 21, 1983

[51] Int. Cl.³ ............................................. C09K 11/06
[52] U.S. Cl. ................... 252/700; 252/186.1; 252/186.41; 252/188.31
[58] Field of Search ............................ 252/700, 186.41

[56] References Cited

U.S. PATENT DOCUMENTS

| | | | |
|---|---|---|---|
| 3,691,085 | 9/1972 | Roberts et al. | 252/700 |
| 3,704,231 | 11/1972 | Bollyky | 252/700 |
| 3,749,679 | 7/1973 | Rauhut | 252/700 |
| 3,888,786 | 6/1975 | Maulding | 252/700 |
| 3,969,263 | 7/1976 | Richter et al. | 252/188.31 |
| 3,994,820 | 11/1976 | Maulding et al. | 252/700 |
| 4,313,843 | 2/1982 | Bollyky et al. | 252/700 |

*Primary Examiner*—A. Lionel Clingman
*Attorney, Agent, or Firm*—Weiser & Stapler

[57] ABSTRACT

Ditridecyl Phthalate and Ditridecyl Adipate are disclosed as being useful for increasing brightness and duration in Chemiluminescent Systems wherein a hydrogen peroxide component and an oxalate ester-fluorescer component are mixed and reacted to produce light.

12 Claims, 8 Drawing Figures

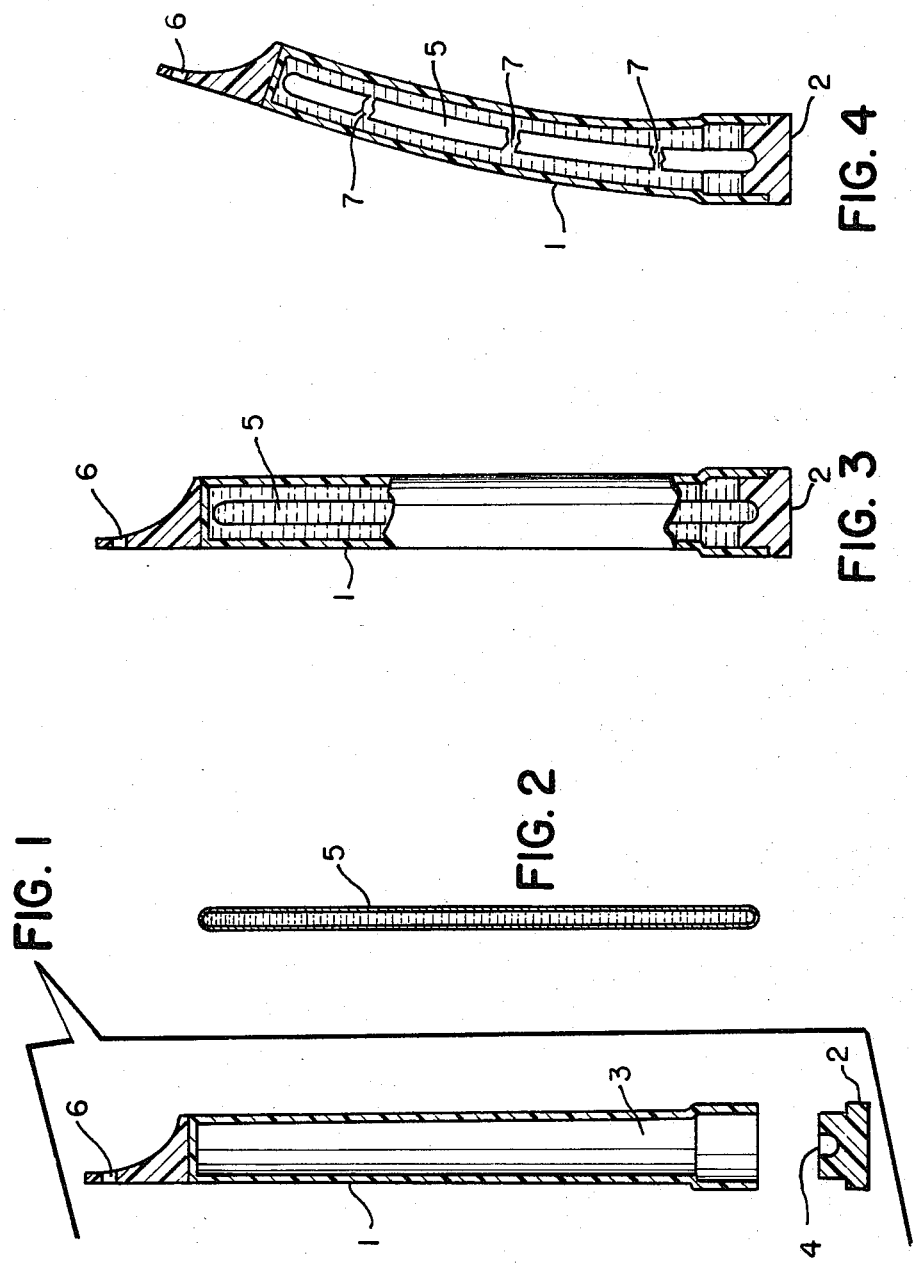

METHOD OF OBTAINING GREATER LIFETIME DURATION FROM CHEMILUMINESCENT SYSTEMS

This invention relates to the addition of two separate esters to a liquid chemiluminescent system, that when each is added, a light of stronger intensity and longer duration is achieved.

Specifically, this invention concerns the addition of ditridecyl phthalate (DTDP) or ditridecyl adipate (DTDA) to a liquid chemiluminescent system based on a chemical reaction concerning an ester of oxalic acid mixed with an organic fluorescer, hydrogen peroxide, and a catalyst, by which the admixing of said DTDP or DTDA to the aforementioned liquid chemiluminescent system produces a greater light output coupled with a greater lifespan for said chemiluminescent system.

It is an object of this invention to obtain a chemiluminescent system producing light of greater intensity.

Another object of this invention is to obtain a chemiluminescent system capable of emitting light for a longer period of time.

A further object of this invention is to obtain various suitable containers for the display of said chemiluminescent system.

These and other objects of this invention will become apparent as the description thereof proceeds.

BACKGROUND OF THE INVENTION

Description of the Prior Art

Under certain circumstances, it is desirable to have a source of visible light that is portable and not electrically activated. Light can be provided by the mixture of chemicals, wherein the luminosity is solely the result of a chemical reaction. Such light is known as chemiluminescent light.

Chemiluminescent light can be used in a variety of emergency situations, such as where a source of electrical power has failed. Its portability makes it also an excellent choice for underwater use. Since chemiluminescence is cold light, it is highly effective around inflammable agents such as spilled gasoline, etc.

The art of generating light from chemical energy is continually in search of processes and compositions which will emit light of improved intensity and duration (most chemiluminescence has a finite lifetime) as contrasted with known processes and compositions.

Prior to this invention, as disclosed in U.S. Pat. No. 3,749,679, Rauhut, there have been a number of variables which influence the chemiluminescent reaction, light output, intensity, and duration.

The term "light" as used herein, is defined as electromagnetic radiation at wavelengths falling between about 350 and 800 millimicrons.

The term "chemiluminescent composition" as used herein, means a mixture which emits light by a chemical reaction.

The term "oxalate component" as used herein, means an aromatic ester of oxalic acid in a suitable solvent.

The term "peroxide component" as used herein, means a solution of a hydrogen peroxide compound, a hydroperoxide compound, or a peroxide compound in a suitable solvent.

The term "fluorescer" as used herein, means a fluorescent compound that when used as a part of the chemiluminescent composition, shifts the energy so as to emit light between 350 and 800 millimicrons.

The term "catalyst" as used herein, means a compound which when mixed to the chemiluminescent composition, accelerates the reaction.

As previously mentioned, there are a number of variables to alter the performance, i.e. light output, of the chemiluminescent composition. These variables are as follows:

1. Oxalate structure
2. Oxalate concentration
3. Peroxide structure
4. $H_2O_2$ concentration
5. Fluorescer structure
6. Fluorescer concentration
7. Catalyst structure
8. Catalyst concentration
9. Selection of solvents for components
10. Reaction temperature, and
11. Additives The effect of the variables is discussed in subsequent paragraphs.

(1) Oxalate Structure

The oxalate ester generally used is a bis (phenyl) oxalate ester having the formula:

in which the phenyl groups (P) are substituted by (1) at least one carbalkoxy group of the formula

in which R is (a) an alkyl group, or (b) a substituted alkyl group, where said substituents are selected from the group comprising fluoro, chloro, trifluoromethyl, alkoxy, cyano,carbalkoxy, and phenyl; and in which (2) the phenyl groups, P, are substituted by at least two additional substituents selected from the group comprising fluoro, chloro, bromo, cyano, trifluoromethyl, carbalkoxy, nitro, alkoxy, alkoxymethyl, methyl, and higher alkyl.

The preferred species are: bis (2, 4, 5-trichloro-6-carbobutoxyphenyl) oxalate and bis (6-carbopentoxy-2, 4, 5-trichlorophenyl) oxalate, also bis (2, 4, 5, trichloro-6-carboxyphenyl) oxalate as disclosed in U.S. Pat. No. 3,816,326, Bollyky.

(2) Oxalate Concentration

The oxalate concentration of reaction mixture may vary widely from 0.01M to 1.5M (moles per liter diluent).

(3) Peroxide Structure

The peroxide employed in the composition may be obtained from any hydroperoxide compound. Examples are: sodium peroxide, sodium perborate, urea peroxide, and hydrogen peroxide. The preferred composition is anhydrous hydrogen peroxide in a suitable solvent such as an ether, an ester, or an aromatic hydrocarbon.

(4) Peroxide Concentration

The hydrogen peroxide concentration in the peroxide component may range from about 0.2M to about 15M.

(5) Fluorescer Structure

The fluorescent compounds used are numerous; and they may be defined broadly as those which do not readily react on contact with the peroxide or with the ester of oxalic acid. Typical suitable fluorescent compounds are those which have a spectral emission falling between 330 millimicrons and 800 millimicrons and which are at least partially soluble in any of the diluents in the subsequent paragraphs. Among these are the conjugated polycyclic aromatic compounds having at least 3 fused rings, such as: anthracene, substituted anthracene, benzanthracene, phenanthracene, substituted phenanthracene, napthacene, substituted naphthacene, pentacene, substituted pentacene, and the like.

Numerous other fluorescent compounds having these properties are well known in the art. Many of these are fully described in "Fluorescence and Phosphorescence" by Peter Pringsheim, Interscience Publishers, Inc., New York, N.Y. 1949. Other fluorescers are described in "The Handbook of Fluorescence Spectra of Aromatic Molecules" second edition by I. Berlman, Academic Press, New York, N.Y. 1971.

The preferred fluorescers for the chemiluminescent composition are: 1-chloro-9,10-bis (phenylethynyl) anthracene, and 2-chloro-9,10-bis (phenylethynyl) anthracene as disclosed in U.S. Pat. No. 3,888,786, Maulding. Also 9,10-diphenylanthracene, and 9,10-diphenyl-9,10-dihydroanthracene.

(6) Fluorescer Concentration

The fluorescer concentration may range from about 0.0002M to about 0.03M. Preferably the concentration ranges from about 0.001M to about 0.01M.

(7) Catalyst Structure

Catalyst structures are those which are weakly basic salt type such as sodium salicylate, and tetrabutylammonium salicylate as disclosed in U.S. Pat. No. 3,775,336, Bollyky. Other preferred catalysts are rubidium chloride, lithium chloride, lithium sulfate, and tetrabutylammonium perchlorate as disclosed in U.S. Pat. No. 3,704,231, Bollyky.

(8) Catalyst Concentration

Preferably, the catalyst is included in the peroxide component to control the lifetime of the chemiluminescent system. The concentration of catalyst used in the peroxide compound may range from about $10^{-5}M$ to about $10^{-2}M$, preferably from about $10^{-4}M$ to about $10^{-3}M$.

(9) Selection of Solvents for Components

The chemiluminescent system is basically a two component system. The first being the oxalate component with the fluorescer in a suitable solvent. The second being the peroxide component with the catalyst in a suitable solvent.

1. Typical diluents, or solvents which can be used for the oxalate component are:
   a. Esters, such as ethyl acetate, ethyl benzoate, dimethyl phthalate, dibutyl phthalate, dioctyl phthalate, methyl formate, triacetin, diethyloxalate, and dioctyl terephthalate.
   b. Aromatic hydrocarbons such as benzene, toluene, ethyl benzene, and butylbenzene.
   c. Chlorinated hydrocarbons such as chlorobenzene, chloroform, and carbon tetrachloride.

Of these solvents, the preferred are ethyl benzoate, dibutyl phthalate, and dimethyl phthalate.

2. Diluents for the peroxide component are broadly primary, secondary, and tertiary alcohols, such as ethyl, hexyl, 2 ethyl hexyl, tertiary butanol, and 3 methyl 3 pentanol. Esters such as dimethyl phthalate and dioctyl phthalate, and ethers such as diethyl ether, and diamyl ether.

(10) Reaction Temperature

Light intensities increase and lifetimes decrease with increasing temperature. It has been found that the superior intensity of chemiluminescence is maintained at a temperature of between about $-40°$ C. and $75°$ C., preferably between about $0°$ C. and $50°$ C.

(11) Additives

The addition of a small amount of polyethylene oxide (0.1 to 5% by weight), and/or a small amount of cellulose acetate butyrate (approx. 0.4% weight) has shown to increase the light output and duration of the chemiluminescent system. U.S. Pat. No. 3,994,820, Maulding and Rauhut.

Also the peroxide component is better stabilized for storage with the addition of about 0.004M 2, 4, 6-tri-tert-butylphenol. U.S. Pat. No. 4,064,064, Rauhut.

SUMMARY OF THE INVENTION

I have unexpectedly discovered that the introduction of 13 carbon alcohol esters, specifically ditridecyl phthalate and ditridecyl adipate, to the chemiluminescent system described in the previous paragraphs, acts as a means of improving the total output of light and lifetime.

DESCRIPTION OF THE PREFERRED EMBODIMENT

In a series of tests, a range of esters were added in varying percentages (by volume) to the chemiluminescent systems, in order to observe what effect (if any) they had on the total light output of these systems.

Some esters had little or no effect on the light output, whereas others tested caused an induction period lasting for several hours before resuming to normal output. Still others diminished the output almost immediately. The remainder of the esters are the ones of this invention. They exhibited a peculiar mechanism of actually increasing the total intensities and durations of light.

In the following tables, this phenomena is exemplified.

All tests were carried out in clean and dry Borosilicate glass vials at $25°$ C.$\pm 1°$ C.

Measurements were made in all glass syringes. The chemiluminescent liquid used was obtained from American Cyanamid's "LIGHTSTICK", being the two component system mentioned under the "Solvents" heading in this disclosure. Separating the two components in this lightstick is a glass ampule inside a plastic container that when the container is bent enough to fracture the ampule, the chemicals immediately mix, producing light.

In table A, 4.5 ml of each ester was added to 1 ml of the chemiluminescent liquid.

TABLE A

| Time elapsed | Plain Lightstick[1] | DTDP[2] | DTDA | TOTM |
|---|---|---|---|---|
| 45 minutes | S* | MS | S | M |
| 2 hours | S | MS | S | W |
| 8 hours | MS | S | S | VW |
| 14 hours | M | S | S | NL |
| 18 hours | W | S | MS | |
| 27 hours | NL | S | MS | |
| 36 hours | | MS | MS | |
| 46 hours | | MS | M | |
| 55 hours | | M | M | |
| 66 hours | | M | W | |
| 78 hours | | W | NL | |
| 113 hours | | VW | | |

TABLE A-continued

| Time elapsed | Plain Lightstick[1] | DTDP[2] | DTDA | TOTM |
|---|---|---|---|---|
| 136 hours | | NL | | |

[1]Standard green lightstick manufactured by American Cyanamid, Bound Brook, N.J.
[2]DTDP = ditridecyl phthalate, DTDA = ditridecyl adipate, TOTM = trioctyl trimellitate.
*letter designation for light intensities are: VS = Very Strong, S = Strong, MS = Medium Strong, M = Medium, MW = Medium Weak, W = Weak, VW = Very Weak, NL = No Light observed.

In table B, 7 ml of each ester was added to 7 ml of the chemiluminescent liquid.

TABLE B

| Time elapsed | Plain Lightstick | DTDP[1] | DMP | DOP | DBP |
|---|---|---|---|---|---|
| 30 minutes | S | S | M | M | MS |
| 2 hours | S | MS | MS | M | MS |
| 5 hours | MS | S | MS | M | M |
| 11 hours | M | S | M | W | W |
| 20 hours | VW | S | VW | VW | VW |
| 24 hours | NL | MS | NL | NL | NL |
| 32 hours | | MS | | | |
| 38 hours | | M | | | |
| 50 hours | | M | | | |
| 62 hours | | W | | | |
| 68 hours | | VW | | | |
| 74 hours | | NL | | | |

[1]DTDP = ditridecyl phthalate, DMP - dimethyl phthalate, DOP = dioctyl phthalate, and DBP = dibutyl phthalate.

In table C, 4 ml of each ester was added to 7 ml of the chemiluminescent liquid.

In this test, one ester, dibutoxyethyl azelate, displayed an interesting reaction. This reaction being that its intensity was quite strong for the first hour, but failed to keep the output at a high level for much after that. The fact that after 2 hours its emission dropped to a medium strength made this ester a poor choice for any long term display purposes.

TABLE C

| Time elapsed | Plain Lightstick | DTDP[1] | DBEA | DOS | DTDA | TEG |
|---|---|---|---|---|---|---|
| 5 minutes | S | S | VS | W | VS | VW |
| 30 minutes | S | S | VS | M | S | VW |
| 2 hours | S | S | M | S | S | NL |
| 12 hours | M | S | M | MS | S | |
| 25 hours | NL | S | M | MS | S | |
| 36 hours | | MS | VW | NL | MS | |
| 50 hours | | M | VW | | M | |
| 74 hours | | MW | NL | | W | |
| 92 hours | | VW | | | NL | |

TABLE C-continued

| Time elapsed | Plain Lightstick | DTDP[1] | DBEA | DOS | DTDA | TEG |
|---|---|---|---|---|---|---|
| 107 hours | | NL | | | | |

[1]DTDP = ditridecyl phthalate, DBEA = dibutoxyethyl azelate, DOS = dioctyl sebacate, DTDA = ditridecyl adipate, and TEG = triethylene glycol.

Broadly, these esters of the invention can be added in amounts ranging from about 0.1% (by volume) to about 1,000% of the chemiluminescent composition. Preferably from about 10% to about 100%.

Being that the energy producing components, i.e.; the oxalate, peroxide, and catalyst, contained in the lightstick marketed by American Cyanamid as a "blue" lightstick are the same as the standard green lightstick, and the molar ratios also being the same (the only difference being that the blue lightstick contains a different fluorescer to shift the emitting wavelength of light to that of a shorter one), the various esters of Tables A to C when added in the same proportions to the blue stick, produced quite similar results.

On the other hand, the lightstick marketed as "high intensity" which displays a bright yellow-green light was shown to have an even longer lifetime and brightness when first modified and then admixed to the esters of this invention.

First, it is necessary to explain what causes this particular lightstick to be of such a high intensity. The primary reason that this item is capable of such a high volume of light output is that the amount of catalyst present (in the peroxide component) is about double that of a standard lightstick. This great addition of catalyst causes the reaction to speed up at quite a pace. To be somewhat more stable to this high driving, it is necessary to double the oxalate molar concentration, and the fluorescer molar concentration as well. Still, this system only has about a 45 minute lifetime, although it is quite bright (900 lumen hours/liter$^{-1}$).

If the peroxide component (ampule) is removed from the standard green, or blue, lightstick and used in place of the high catalyst ampule in the high light yellow-green stick, there is no longer an overdriving of the system thus resulting in a longer lifetime available. This is due to the excess concentrations of oxalate and fluorescer.

The esters of this invention still are capable of extending even further the lifetime and brightness of this modified system as shown in Tables D and E below. Tests were performed at 70° F., in clean and dry borosilicote glass vials.

In Table D, 2cc of each ester is added to 7cc of the chemiluminescent liquid.

TABLE D

| Time elapsed | Modified Lightstick[1] | DMP | DEP | DOP[2] | DTDP | TEC | DTDA |
|---|---|---|---|---|---|---|---|
| 10 minutes | VS | S | S | S | S | MS | S |
| 90 minutes | S | S | S | S | MS | MS | S |
| 8 hours | MS | MS | MS | MS | MS | M | MS |
| 17 hours | MS | MS | MS | MS | MS | M | MS |
| 22 hours | M | M | M | MS | MS | S | MS |
| 32 hours | M | M | M | M | MS | S | MS |
| 45 hours | W | MW | M | M | MS | MS | M |
| 50 hours | MW | MW | M | M | M | M | M |
| 58 hours | VW | MW | MW | M | M | M | M |
| 68 hours | NL | NL | NL | M | M | MW | M |
| 77 hours | | | | MW | M | NL | M |
| 81 hours | | | | NL | M | | M |
| 96 hours | | | | | M | | MW |

TABLE D-continued

| Time elapsed | Modified Lightstick[1] | DMP | DEP | DOP[2] | DTDP | TEC | DTDA |
|---|---|---|---|---|---|---|---|
| 113 hours | | | | | M | | MW |
| 127 hours | | | | | MW | | MW |
| 140 hours | | | | | MW | | VW |
| 149 hours | | | | | NL | | NL |

[1]High intensity yellow oxalate and fluorescer with standard ampule substituted.
[2]DOP = dioctyl phthalate, TEC = triethyl citrate.

In Table E, 5cc of each ester is added to 10cc of the chemiluminescent liquid.

TABLE E

| Time elapsed | Modified Lightstick[1] | DMP | DBP | DOP | DTDP | DTDA |
|---|---|---|---|---|---|---|
| 0 minutes | VS | MS | MS | S | S | VS |
| 30 minutes | VS | MS | MS | S | S | VS |
| 6 hours | S | MS | MS | MS | MS | S |
| 14 hours | MS | MS | M | M | MS | MS |
| 38 hours | W | M | M | M | MS | MS |
| 41 hours | W | M | MW | M | M | MS |
| 50 hours | MW | M | W | M | M | M |
| 62 hours | VW | MW | VW | MW | M | M |
| 77 hours | NL | NL | NL | MW | M | M |
| 92 hours | | | | NL | M | M |
| 102 hours | | | | | M | MW |
| 118 hours | | | | | MW | MW |
| 125 hours | | | | | MW | W |
| 144 hours | | | | | MW | W |
| 159 hours | | | | | W | NL |
| 166 hours | | | | | NL | |

[1]High intensity yellow oxalate and fluorescer with standard ampule substituted.

Being that this invention relates to a liquid system, its portability or storage is limited without suitable containers. Therefore, an important aspect of this invention concerns the various containers employable for the chemiluminescent system disclosed.

Obviously, the reacted chemiluminescent liquid can be poured back into a "lightstick" tube and the end cap welded in place to cause a leakproof hand held illuminated wand with greater intensity and duration.

Another container for the disclosed reacted system could be a small diameter section of tubing (1/16×⅛) fashioned out of polyvinyl chloride, ethylene vinyl acetate, polyethylene, teflon, and the like, being approximately 16 inches long, filled with the chemiluminescent system, having both ends sealed by conventional sealing equipment, and a short piece (¾ inch) of flexible tubing fastened at one end by interference fit, to act as a connector for the long piece of tubing, to constitute a chemiluminescent necklace of superior intensity and duration.

The two preferred esters (DTDP and DTDA) are completely miscible with either the oxalate-fluorescer component, or the peroxide component, of a "lightstick", and can be stored in one or both containers, to be mixed at a later time as the "lightstick" is activated, to produce the superior light herein disclosed.

A necklace that is activated by similar means as the lightstick, i.e., an outer plastic housing containing one of the two chemiluminescent components and an inner frangible container, such as glass, containing the second component, that when the outer container is bent, the glass ampule shatters mixing the two components causing light, may also contain the esters of this invention in either container, or both, to produce the superior light disclosed.

This invention may be more clearly understood by reference to the drawings in which:

FIG. 1 shows one outer flexible tube for one embodiment of the chemiluminescent lightstick.

FIG. 2 shows the inner rigid tube.

FIG. 3 shows one embodiment of an assembled lightstick.

FIG. 4 shows the method of activation of the stick.

Figure 5:
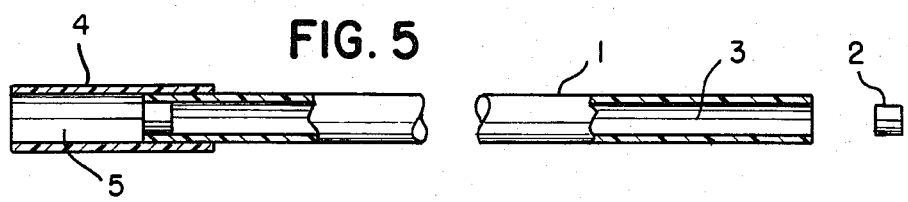
FIG. 5 shows another outer flexible tube of at least twice the length of the lightstick to be bent in a complete circle for use as a necklace, or other jewelry.

Referring to FIGS. 1 and 2, the device comprises a flexible tube 1 with a plug 2, to close opening 3 of the tube 1 by a press fit. Plug 2 has a bore 4 for receiving a tube 5 of a rigid, breakable material. A hole 6 is provided for hanging entire tube 1 on a hook or string, etc.

In FIG. 3, the assembled device is shown, with tube 5 fitted in plug 2, which is in turn fitted into opening 3 of tube 1, holding tube 5 substantially parallel to the longitudinal axis of tube 1. Tube 5 is filled with one component of the chemiluminescent system, previously described, for example the peroxide component or the peroxide component with either of the two esters of this invention admixed. Tube 1 is filled with the second component, described previously, such as the oxalate-fluorescer solution or the oxalate-fluorescer solution with either of the two esters of this invention admixed.

Tube 1 is a flexible, transparent or translucent material having sufficient rigidity to maintain a shape, such as polyethylene, polypropylene, teflon and the like. Tube 5 is a rigid, breakable or frangible material such as glass, or a relatively brittle thermoset resin, e.g., thin walled bakelite or other suitable material and need not be transparent or translucent. Plug 2 may be any suitable material such as plastic or wood. Plastics are desirable in view of their ease of fabrication. Additionally, if plug 2 is the same plastic material as tube 1, plug 2 can be spin welded in place to insure a leak proof seal.

To activate the device and provide the superior light of this invention, tube 1 of the lightstick is flexed slightly as shown in FIG. 4. Tube 5 which is rigid, is bent and broken at a number of points 7 allowing its contents to admix with that of tube 1 to bring about the chemiluminescent reaction and obtain a light emission visible through tube 1.

Figure 6:
FIG. 6 shows the inner rigid tube for the necklace.

In FIGS. 5 and 6 the device comprises a flexible tube 1 with a plug 2 to close opening 3 of a tube 1 by a press fit. Tube 4 is a connector for plugging opposite end of tube 1 into hole 5. Tube 6 is received by tube 1 through opening 3.

Figure 7:
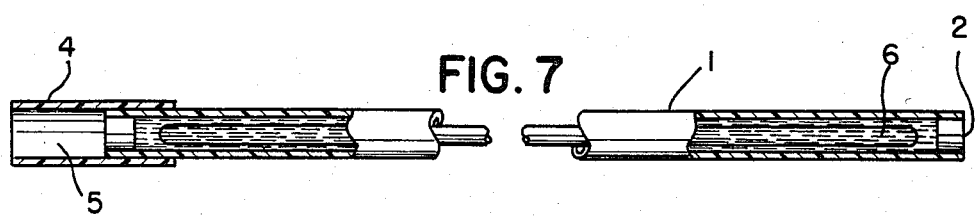
FIG. 7 shows one embodiment of an assembled necklace.

In FIG. 7 the assembled device is shown with tube 6 fitted in tube 1. Tube 6 is filled with one component of the chemiluminescent system, previously described, such as the peroxide component or the peroxide component with either of the two esters of this invention admixed. Tube 1 is filled with the second component, described previously, such as the oxalate-fluorescer solution or the oxalate-fluorescer solution with either of the two esters of this invention admixed. A combination of heat and pressure can be provided around the circumference of tube 1 near plug 2 to melt the interface of said tube and plug to cause a leak proof seal.

Tube 1 is a flexible, transparent or translucent material having sufficient rigidity to maintain a shape, such as polyethylene, polypropylene, teflon, polyvinyl chloride, ethyl vinyl acetate and the like. Tube 6 is a rigid breakable or frangible material such as glass or a relatively brittle thermoset resin, e.g., thin walled bakelite or other suitable material and need not be transparent or translucent. Plug 2 may be any thermosetting plastic, preferably of the same material as tube 1. Tube 4 can be made of any flexible, transparent material such as polyvinyl chloride or ethyl vinyl acetate.

Figure 8:
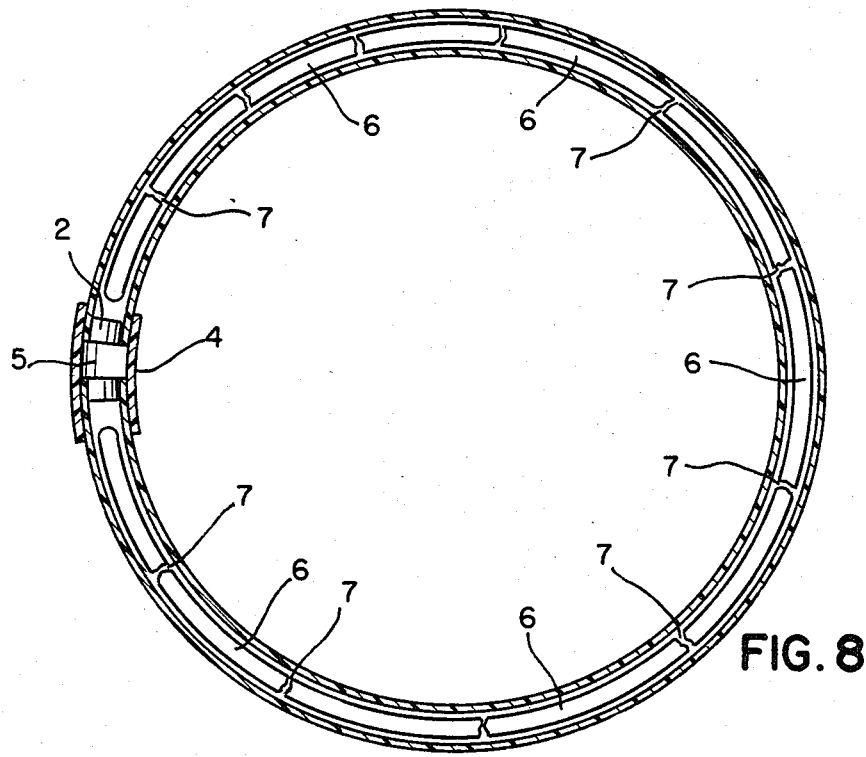
FIG. 8 shows the method of activation of the necklace.

To activate the device and provide the superior light of this invention tube 1 of the necklace is flexed throughout the length as shown in FIG. 8 in order to break tube 6 at a number of points 7 allowing its contents to admix with that of tube 1 to bring about the chemiluminescent reaction and obtain light emission visible through tube 1.

This device as shown in FIG. 8 can be bent in a complete circle and fastened with connector 4 by means of an interference fit to constitute a self-connecting chemiluminescent necklace.

The above descriptions should not be construed as limitative on the scope of the invention, but rather as various exemplifications of a few preferred embodiments thereof.

Accordingly, the scope of the invention should be determined not by the embodiments illustrated, but by the appended claims and their legal equivalent.

What is claimed is:

1. A chemiluminescent composition essentially consisting of liquid solution in organic solvent of a bis-ester of oxalic acid, an organic fluorescent compound, hydrogen peroxide, and a catalyst, present in relative proportions to produce chemiluminescent light, and a specific $C_{13}$ alkyl ester selected from the group consisting of ditridecyl phthalate and ditridecyl adipate present in the composition in a quantity ranging from about 0.1% to about 1000% (by volume) of the other ingredients of the chemiluminescent, composition said bis-ester having the formula: in which P represents a phenyl group substituted by (1) at least one carbalkoxy group of the formula

in which R is a lower alkyl group, or a substituted lower alkyl group, where said substituents are selected from the group consisting of fluoro, chloro, trifluoromethyl, lower alkoxy, cyano, lower carbalkoxy, and phenyl; or (2) the phenyl group, P, is substituted by at least two additional substituents selected from the group consisting of fluoro, chloro, bromo, cyano, trifluoromethyl, lower carbalkoxy, nitro, lower alkoxy, lower alkoxymethyl and alkyl.

2. A composition according to claim 1 wherein said bis-ester of oxalic acid is selected from the group consisting of bis (2, 4, 5-trichloro-6-carboxyphenyl) oxalate, bis (2, 4, 5-trichloro-6-carboalkoxyphenyl) oxalate; bis (2, 4, 5-trichloro-6-carbobutoxyphenyl oxalate; and bis (2, 4, 5-trichloro-6-carbopentoxyphenyl) oxalate.

3. A composition according to claim 1 wherein said fluorescent compound is selected from the group consisting of 9,10-bis (phenylethynyl) anthracene, 9,10-diphenylanthracene, and 9,10-diphenyl-9,10-dihydroanthracene.

4. A composition according to claim 3 wherein said fluorescent compound is a monochloro, dichloro, or methoxy substituted derivative of 9,10-bis (phenylethynyl) anthracene.

5. A composition according to claim 1 wherein said catalyst is a weakly basic salt, or a metal salt selected from the group of rubidium: lithium: and cesium.

6. A composition according to claim 1 wherein said $C_{13}$ alkyl ester is ditridecyl phthalate.

7. A composition according to claim 1 wherein said $C_{13}$ alkyl ester is ditridecyl adipate.

8. A composition according to claim 1 wherein said $C_{13}$ alkyl ester is stored in the inner ampule of a two component chemiluminescent system.

9. A composition according to claim 1 wherein said $C_{13}$ alkyl ester is stored in the outer container of a two component chemiluminescent system.

10. A composition according to claim 1 wherein said $C_{13}$ alkyl ester is stored in both containers of a two component chemiluminescent system.

11. A composition according to claim 1 wherein said $C_{13}$ alkyl ester is stored in at least one container of a two component chemiluminescent system.

12. In combination, a chemiluminescent composition according to claim 1 within a container through which light produced by said chemiluminescent composition is visible.

* * * * *